United States Patent
Taniguchi et al.

(10) Patent No.: US 6,720,367 B2
(45) Date of Patent: Apr. 13, 2004

(54) INK COMPOSITION COMPRISING CATIONIC, WATER-SOLUBLE RESIN

(75) Inventors: Makoto Taniguchi, Nagano (JP); Hitoshi Ohta, Nagano (JP); Kazuhiko Kitamura, Nagano (JP)

(73) Assignee: Seiko Epson Corporation, Tokyo-to (JP)

( * ) Notice: Subject to any disclaimer, the term of this patent is extended or adjusted under 35 U.S.C. 154(b) by 0 days.

(21) Appl. No.: 09/047,717

(22) Filed: Mar. 25, 1998

(65) Prior Publication Data

US 2001/0018471 A1 Aug. 30, 2001

(30) Foreign Application Priority Data

Mar. 25, 1997 (JP) ................................................ 9-72217

(51) Int. Cl.⁷ ......................... C09D 11/10; C08L 39/00; C08L 39/02
(52) U.S. Cl. ...................................... 523/160; 524/555
(58) Field of Search ............................... 523/160, 161; 106/31.13, 31.27, 31.28, 31.46, 31.49, 31.6, 31.76, 31.78; 524/555

(56) References Cited

U.S. PATENT DOCUMENTS

| | | | | |
|---|---|---|---|---|
| 3,686,151 A | * | 8/1972 | Keim ........................ 528/332 |
| 4,613,525 A | * | 9/1986 | Miyamoto et al. .......... 427/256 |
| 5,017,224 A | * | 5/1991 | Tomita et al. ............ 106/31.46 |
| 5,019,164 A | * | 5/1991 | Tomita et al. ........... 106/31.43 |
| 5,223,026 A | * | 6/1993 | Schwarz, Jr. ............ 106/31.43 |
| 5,320,897 A | * | 6/1994 | Kondo et al. ............... 428/195 |
| 5,370,731 A | * | 12/1994 | Yamashita et al. ....... 106/31.43 |
| 5,555,008 A | * | 9/1996 | Stoffel et al. ............... 347/100 |
| 5,618,338 A | * | 4/1997 | Kurabayashi et al. .... 106/31.37 |
| 5,622,549 A | * | 4/1997 | Yui et al. ................. 106/31.58 |
| 5,624,484 A | * | 4/1997 | Takahashi et al. ........ 106/31.75 |
| 5,667,572 A | * | 9/1997 | Taniguchi et al. ....... 106/31.36 |
| 5,746,818 A | * | 5/1998 | Yatake ..................... 106/31.86 |
| 5,769,930 A | * | 6/1998 | Sano et al. .............. 106/31.36 |
| 5,805,190 A | * | 9/1998 | Tsuchii et al. .............. 348/246 |
| 5,833,744 A | * | 11/1998 | Breton et al. ............ 106/31.59 |
| 5,835,116 A | * | 11/1998 | Sato et al. ..................... 347/98 |
| 5,846,306 A | * | 12/1998 | Kubota et al. ........... 106/31.75 |
| 5,861,447 A | * | 1/1999 | Nagasawa et al. .......... 523/161 |
| 5,866,638 A | * | 2/1999 | Shimomura et al. ........ 523/161 |
| 5,871,572 A | * | 2/1999 | Marritt .................... 106/31.36 |
| 6,174,354 B1 | * | 1/2001 | Takizawa et al. ........ 106/31.43 |

FOREIGN PATENT DOCUMENTS

| | | |
|---|---|---|
| EP | 0607445 | 7/1994 |
| EP | 0675178 | 10/1995 |
| EP | 0675179 | 10/1995 |

\* cited by examiner

Primary Examiner—Callie Shosho
(74) Attorney, Agent, or Firm—Ladas & Parry

(57) ABSTRACT

A composition, for ink jet recording, containing a cationic, water-soluble resin comprising a repeating unit represented by the following formula (I) can realize an image possessing excellent waterproofness and lightfastness and having no significant feathering or bleeding, especially no significant color-to-color bleeding:

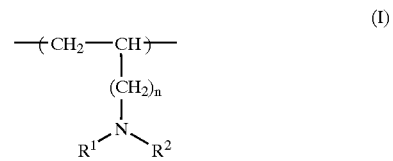

(I)

wherein $R^1$ and $R^2$ which may be the same or different represent a hydrogen atom or a $C_{1-5}$ alkyl group, provided that $R^1$ and $R^2$ do not simultaneously represent a hydrogen atom; and n is 0, 1, or 2.

46 Claims, No Drawings

INK COMPOSITION COMPRISING CATIONIC, WATER-SOLUBLE RESIN

BACKGROUND OF THE INVENTION

1. Field of the Invention

The present invention relates to an ink composition suitable for ink jet recording.

2. Background Art

It is important that an image formed by an ink composition possesses good waterproofness and lightfastness and has no significant feathering or bleeding.

In order to realize good waterproofness, a combination of a cationic resin with an anionic dye has hitherto been used in the art.

For example, Japanese Patent Laid-Open No. 119280/1987 discloses an ink comprising a hydroxyethylated polyethylene-imine polymer and a dye component. This publication describes that the combination of the polyethylene-imine polymer with the dye component can develop waterproofness.

Japanese Patent Publication No. 91494/1995 discloses an ink composition comprising a hydroxyalkylated polyallylamine polymer and a dye. This publication describes that the combination of the primary amine with the dye can develop waterproofness.

For the above two inks, a further improvement in ensuring satisfactory waterproofness of the image is required because the polymer has been substituted by a highly hydrophilic hydroxyalkyl group.

Japanese Patent Laid-Open Nos. 255876/1990, 296876/1990, and 188174/1991 disclose an ink composition comprising a polyamine, having a primary amine group, with a molecular weight of not less than 300, an anionic dye, and a stabilizer. These publications describe that the combination of the primary amine with the anionic dye can develop waterproofness.

Japanese Patent Laid-Open No. 305011/1995 discloses a water-base ink comprising a basic, water-soluble polymer, an anionic dye with a volatile base as a counter ion, and a buffer with a volatile base as a counter ion. This publication describes that the volatile base inhibits the dissociation of the polymer in the ink and, on paper, the volatile base is evaporated to promote a salt formation reaction between the polymer and the dye, thereby developing waterproofness.

Japanese Patent Laid-Open No. 238783/1987 discloses an ink jet recording sheet containing a homopolymer of a diallylaminate and a monoallylaminate or a copolymer of the diallylaminate with the monoallylaminate. This publication describes that an insolubilizing reaction between the polymer and the dye is created on this recording medium to develop waterproofness.

For some of the above ink compositions, a further improvement in lightfastness is required. For example, in the case of ink compositions using polyethyleneimine, which is specifically described as the cationic resin in Japanese Patent Laid-Open Nos. 255876/1990, 296876/1990, and 188174/1991, this resin strongly attacks the dye, and, for example, when these inks are allowed to stand at a high temperature, this results in decomposition of the dye or accelerates the photodecomposition of the print to often render the lightfastness of the ink lower than that of the ink using the dye alone.

Japanese Patent Laid-Open No. 305011/1995 discloses a recording method using the recording medium containing a cationic resin. Since the ink composition disclosed in the publication is not waterproof, the waterproofness cannot be developed in an image when recording media other than the recording medium described in this publication are used.

For the printed image, what is further important is to prevent feathering or bleeding, especially color-to-color bleeding in the case there inks of two or more colors are used.

SUMMARY OF THE INVENTION

The present inventors have now found that an ink composition containing a cationic, water-soluble resin having a specific structure can realize an image possessing good waterproofness and lightfastness and having no significant feathering or bleeding. The present invention has been made based on such finding.

It is therefore an object of the present invention to provide an ink composition which can yield an image possessing good waterproofness and lightfastness and having no significant feathering or bleeding, especially no significant color-to-color bleeding.

Furthermore, it is an object of the present invention to provide an ink composition suitable for ink jet recording.

According to one aspect of the present invention, there is provided an ink composition comprising at least an alkali-soluble colorant, a water-soluble organic solvent, water, and a cationic, water-soluble resin, the cationic, water-soluble resin comprising a repeating unit represented by the following formula (I):

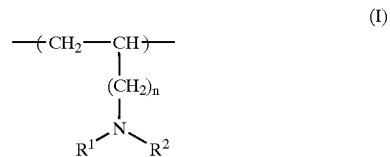

wherein $R^1$ and $R^2$ which may be the same or different represent a hydrogen atom or a $C_{1-5}$ alkyl group, provided that $R^1$ and $R^2$ do not simultaneously represent a hydrogen atom: and n is 0, 1, or 2.

DETAILED DESCRIPTION OF THE INVENTION

Ink Composition

The ink composition according to the present invention may be used in recording methods using an ink composition. Recording methods using an ink composition include, for example, an ink jet recording method, a recording method using writing utensils, such as pens, and other various recording methods. In particular, the ink composition according to the present invention is preferably used in the ink jet recording method.

The ink composition according to the present invention contains basically alkali-soluble colorant, a water-soluble organic solvent, water, and a cationic, water-soluble resin, the cationic, water-soluble resin comprising a repeating unit represented by the formula (I).

According to the present invention, the cationic, water-soluble resin is stably dissolved in the ink composition. Once the ink composition deposits onto a recording medium, the cationic, water-soluble resin electrostatically interacts with a colorant, and, in addition, the resin also interacts with the recording medium. Therefore, the resin is stably fixed on the recording medium. It is believed that the fixation of the resin on the recording medium permits the colorant, together with the resin, to be fixed on the recording medium, thus imparting waterproofness to the printed image. It is also believed that an image having no significant feathering or bleeding is realized as a result of firm fixation of the colorant on the recording medium.

For the cationic, water-soluble resin used in the present invention, $R^1$ and $R^2$ in the formula (I) may be the same or different and represent a hydrogen atom or a $C_{1-5}$ alkyl group, preferably a methyl group. However, $R^1$ and $R^2$ do not simultaneously represent a hydrogen atom. Most preferably, $R^1$ and $R^2$ simultaneously represent a methyl group.

In the formula (I), n is 0, 1, or 2, preferably 1.

According to a preferred embodiment of the present invention, the average molecular weight of the cationic, water-soluble resin is preferably about 300 to 10,000, more preferably about 400 to 5,000, most preferably about 500 to 2,500.

According to a preferred embodiment of the present invention, the cationic, water-soluble resin may comprise units other than the repeating unit represented by the formula (I). This can improve properties of the cationic, water-soluble resin. Monomers for providing units which may be contained in the resin include ethylene, propylene, isobutylene, styrene, vinyl chloride, vinylidene chloride, vinyl alcohol, vinylamine, vinyl acetate, acrylic acid or acrylic esters (for example, lower alkyl esters), methacrylic acid or methacrylic esters (for example, lower alkyl esters), acrylonitrile, methyl vinyl ether, vinylpyrrolidone, allylamine, diallylamine, and sulfur dioxide. Although the amount of units, derived from these monomers, present in the cationic, water-soluble resin is not particularly limited, it is preferably not more than 70%, more preferably not more than 30%, in terms of the molar ratio. In the cationic, water-soluble resin, these units may be present in a block form or a random form.

According to a preferred embodiment of the present invention, the ink composition of the present invention may further comprise a water-soluble resin other than the cationic, water-soluble resin. The water-soluble resin other than the cationic, water-soluble resin is preferably a nonionic, water-soluble resin, and examples of nonionic, water-soluble resins usable herein include polyacrylamide, polymethacrylic acid hydroxy esters, such as polyhydroxyethyl methacrylate, polyvinyl pyrrolidone, polyvinyl alcohol, and polyethylene glycol. Addition of these water-soluble resins can further stabilize the ink composition.

The alkali-soluble colorant contained in the ink composition according to the present invention may be either a dye or a pigment. The term "alkali-soluble" used herein means "soluble in an alkaline medium." The water-soluble group contained in the molecule may be an acidic or basic dissociable group or non-dissociable functional group, or alternatively may be a group containing a plurality of the above groups. Further, the colorant may be one soluble in an acidic solution so far as it is soluble in an alkali.

While the content of the colorant may not be limited, it is preferably 0.5 to 20% by weight based on the total weight of the ink composition. The colorant in the above content range can realize a printed image having satisfactory optical density. Further, the viscosity of the ink composition containing the colorant in the above content range can be easily modified to a value suitable for ink jet recording.

More preferably, the colorant is selected from organic dyes or organic pigments which are suitable because of high color density per unit weight and bright color.

Useful dyes are organic colored materials soluble in water and fall into categories of acidic dyes, direct dyes, reactive dyes, soluble vat dyes, and food dyes according to the color index. Further, colorants, insoluble in neutral water, falling within categories of oil-soluble dyes and basic dyes according to the color index may also be used so far as they are soluble in an aqueous alkali solution.

Preferably, the pigment is selected from those falling into the category of pigments according to the color index. Pigments are generally recognized as water-insoluble, organic colored materials, some of which are soluble in an alkali and usable in the present invention.

Examples of dyes and pigments usable herein include: yellow dyes and pigments, such as C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165, C.I. Direct Yellow 1, 8, 11, 12, 24, 26, 27, 33, 39, 44, 50, 55, 58, 85, 86, 87, 88, 89, 98, 110, 132, 142, and 144, C.I. Reactive Yellow 1, 2, 3, 4, 6, 7, 11, 12, 13, 14, 15, 16, 17, 18, 22, 23, 24, 25, 26, 27, 37, and 42, C.I. Food Yellow 3 and 4, C.I. Solvent Yellow 15, 19, 21, 30, and 109, and C.I. Pigment Yellow 23; red dyes and pigments, such as C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322, C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231, C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64, C.I. Solubilized Red 1, C.I. Food Red 7, 9, and 14, and C.I. Pigment Red 41, 48, 54, 57, 58, 63, 68, and 81; blue dyes and pigments, such as C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249, C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249, C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46, C.I. Solubilized Vat Blue 1, 5, and 41, C.I. Vat Blue 29, C.I Food Blue 1 and 2, C.I. Basic Blue 9, 25, 28, 29, and 44, and C.I. Pigment Blue 1 and 17; and black dyes and pigments, such as C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191, C.I. Direct Black 17, 19, 22, 32, 35, 38, 51, 56, 62, 71, 74, 75, 77, 94, 105, 106, 107, 108, 112, 113, 117, 118, 132, 133, 146, 154, 168, 171, and 195, C.I. Reactive Black 1, 3, 4, 5, 6, 8, 9, 10, 12, 13, 14, and 18, C.I. Solubilized Vat Black 1, and C.I. Food Black 2. These colorants may be used alone or as a mixture of two or more.

In the ink composition according to the present invention, water is a main solvent. Water may be pure water obtained by ion exchange, ultrafiltration, reverse osmosis, distillation or the like, or ultrapure water. Further, water, which has been sterilized by ultraviolet irradiation or by addition of hydrogen peroxide, is suitable because, when the ink composition is stored for a long period of time, it can prevent the growth of mold or bacteria.

The ink composition according to the present invention may further comprise a base. Examples of bases usable herein include: inorganic bases, such as sodium hydroxide, potassium hydroxide, lithium hydroxide, calcium hydroxide, barium hydroxide, strontium hydroxide, radium hydroxide, beryllium hydroxide, magnesium hydroxide, and ammonia; mono-, di-, and tri-lower alkylamines, such as ethylamine, diethylamine, triethylamine, propylamine, dipropylamine, diisopropylamine, tert-butylamine, dibutylamine, diisobutylamine, isopropylamine, sec-butylamine, and pentylamine; lower alkyl lower hydroxyalkoxyamines, such as 3-ethoxypropylamine and 3-methoxypropylamine; lower alkyl lower alkoxyamines, such as 3-ethoxypropylamine and 3-methoxypropylamine; mono-, di-, and tri-lower hydroxyalkylamines, such as 2-aminoethanol, 2-(dimethylamino)ethanol, 2-(diethylamino)ethanol, diethanolamine, N-butyldiethanolamine, triethanolamine, aminomethylpropanol, and triisopropanolamine; and organic amines, such as iminobispropylamine, 3-diethylaminopropylamine, dibutylaminopropylamine, methylaminopropylamine, dimethylaminopropanediamine, and methyliminobispropylamine. These bases can stably dissolve the cationic, water-soluble resin and the colorant and can maintain the dissolved state. For example, when an acid addition salt is used as the cationic, water-soluble resin, the alkali-soluble colorant is in some cases insoluble. Addition of the base enables the alkali-soluble colorant to be stably dissolved.

In the ink composition according to the present invention, the water-soluble organic solvent means to a medium having an ability to dissolve a solute and is preferably selected from water-soluble solvents having a smaller vapor pressure than water. Examples thereof include: polyhydric alcohols, such as ethylene glycol, propylene glycol, butanediol, pentanediol, 2-butene-1,4-diol, 2-methyl-2,4-pentanediol, glycerin, 1,2,6-hexanetriol, diethylene glycol, and dipropylene glycol; ketones, such as acetonylacetone; esters, such as γ-butyrolactone, diacetin, and triethyl phosphate; lower alkoxy lower alcohols, such as 2-methoxyethanol and 2-ethoxyethanol; furfuryl alcohol; tetrahydrofurfuryl alcohol; and thiodiglycol. Further, solvents usable herein include not only those that are liquid at room temperature but also those that are solid at room temperature and, when heat melted, can function as a solvent, and those that, when used in combination with an aqueous solution or other solvent(s), can function as a solvent. That the vapor pressure of the organic solvent is lower than that of pure water is advantageous in that, even though drying of the ink proceeds at the front end of the ink jet head, the organic solvent can stably dissolve the solutes.

Although the amount of the water-soluble organic solvent used may be suitably determined, it is preferably, for example, 5 to 50% by weight based on the total weight of the ink.

According to a preferred embodiment of the present invention, the ink composition according to the present invention may further comprise an additional organic solvent. Examples of additional solvents usable herein include imidazole, methylimidazole, hydroxyimidazole, triazole, nicotinamide, dimethylaminopyridine, ε-caprolactam, 1,3-dimethyl-2-imidazolidinone, lactamide, sulfolane, dimethylsulfoxide, 1,3-propanesultone, methyl carbamate, ethyl carbamate, 1-methylol-5,5-dimethylhydantoin, hydroxyethylpiperazine, piperazine, ethyleneurea, propyleneurea, ethylene carbonate, propylene carbonate, dimethyl sulfoxide, N-methyl-2-pyrrolidinone, 2-pyrrolidinone, acetamide, formamide, dimethylformamide, N-methylformamide, and dimethylacetamide. The addition of the organic solvent can prevent the creation of a precipitate, for example, at a low temperature and permits printing to be stably performed under such an environment.

If necessary, assistants commonly used in the ink for ink jet recording may be added to the ink composition according to the present invention. Examples of assistants usable herein include penetration accelerators, viscosity modifiers, surface tension modifiers, hydrotropy agents, humectants, pH adjustors, antimolds, chelating agents, preservatives, and rust preventives. When the ink is used in an ink jet recording method wherein the ink is charged, it is possible to add a specific resistance modifier selected from inorganic salts, such as lithium chloride, sodium chloride, and ammonium chloride.

Penetration accelerators usable herein include: lower alcohols, such as ethanol, isopropanol, butanol, and pentanol; cellosolves, such as ethylene glycol monobutyl ether; carbitols, such as diethylene glycol monobutyl ether, triethylene glycol monobutyl ether glycol ether; and surfactants.

Surface tension modifiers usable herein include diethanolamine, triethanolamine, alcohols, such as glycerin and diethylene glycol, and nonionic, cationic, anionic, or amphoteric surfactants.

Preferred hydrotropy agents usable herein include urea, alkylureas, ethyleneurea, propyleneurea, thiourea, guanidine acid salts, and tetraalkylammonium halides.

Humectants usable herein include glycerin and diethylene glycol which may be added also as the water-soluble organic solvent. Further humectants include saccharides, such as maltitol, sorbitol, gluconic lactone, and maltose.

Bases described above may be used also as the pH adjustor.

Ink set

According to another aspect of the present invention, there is provided an ink set comprising: a black ink comprising at least one alkali-soluble colorant selected from a group of dyes consisting of C.I. Direct Black 19, 35, 154, 168, 171, and 195 and C.I. Food Black 2; a yellow ink comprising at least one colorant selected from a group of dyes consisting of C.I. Direct Yellow 50, 55, 86, 132, 142, and 144 and C.I. Acid Yellow 23; a cyan ink comprising at least one colorant selected from a group of dyes consisting of C.I. Direct Blue 86, 87, and 199 and C.I. Acid Blue 9 and 249, and a magenta ink comprising at least one colorant selected from a group of dyes consisting of C.I. Direct Red 9 and 227, C.I. Acid Red 52 and 289, and dyes represented by the following structural formula (II). Use of this ink set can provide a full color image having excellent waterproofness, independently of the recording medium. Without intending to be bound by theory, it is believed that the above groups of dyes exhibit strong electrostatic interaction with the cationic, water-soluble resin comprising a repeating unit represented by the formula (I), imparting excellent waterproofness.

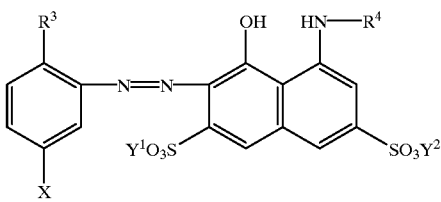

(II)

wherein $R^3$ and $R^4$ represent a hydrogen atom, a $C_{1-5}$ alkyl group, an aryl group, a $C_{1-5}$ alkoxy group, or a phenoxy group or a derivative thereof, a triazine ring or a derivative thereof, a carboxyl group or a salt thereof, or a sulfonyl group or a derivative thereof;

X represents a hydrogen or halogen atom; and $Y^1$ and $Y^2$ which may be the same or different represent an alkali metal atom, ammonium, or a $C_{1-5}$ alkylammonium.

Among the group of dyes represented by the following structural formula (II), dyes represented by the following structural formula (III) are preferred. These dyes fall into the category of C.I. Acid Red 249 according to the color index.

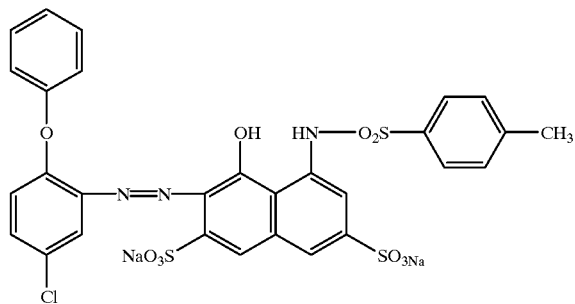

(III)

Further, dyes represented by the following structural formula (IV) may also be preferably used:

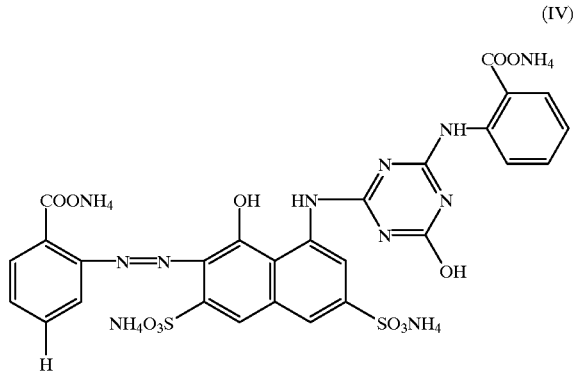

(IV)

Use of the ink composition according to the present invention in combination with an ink composition containing an anionic material can realize an image having no significant color-to-color bleeding between two inks. It is believed that upon contact of the two ink compositions on a recording medium, the cationic, water-soluble resin contained in the ink composition according to the present invention is reacted with the anionic material to form a precipitate, inhibiting further spreading of the ink composition on the recording medium. This results in the realization of an image having no significant color-to-color bleeding.

Thus, according to another aspect of the present invention, there is provided an ink set comprising the ink composition of the present invention as a first ink composition and the ink composition containing an anionic material as a second ink composition.

The ink set generally comprises an yellow ink, a magenta ink, a cyan ink, and a black ink. According to a preferred embodiment of the present invention, the ink composition of the present invention constitutes a yellow ink, a magenta ink, and a cyan ink with the ink composition containing an anionic material constituting a black ink, or alternatively, the ink composition of the present invention constitutes a black ink with the ink composition containing an anionic material constituting a yellow ink, a magenta ink, and a cyan ink.

The second ink composition, that is, the ink composition containing an anionic material, basically comprises a colorant, a water-soluble organic solvent, water, an anionic material, and a base.

According to a preferred embodiment of the present invention, the anionic material may be an anionic resin. Preferred examples of anionic resins usable herein include those which has as a functional group an anionic group, such as a sulfonic acid, carboxylic acid, phosphoric acid, or hydroxyl group, and, when combined with a base to form a salt, can be made water-soluble. Specific examples thereof include: cellulose derivatives, such as carboxymethyl cellulose and viscose; naturally occurring polymers, such as alginic acid, gum arabic, tragacanth, and lignin sulfonic acid; starch derivatives, such as starch phosphate and carboxymethyl starch salts; and synthetic polymers, such as polyacrylic acid, polymethacrylic acid, polyvinylsulfuric acid, polyvinylsulfonic acid, condensed naphthalenesulfonic acid, ethylene/acrylic acid copolymer, styrene/acrylic acid copolymer, styrene/methacrylic acid copolymer, acrylic ester/acrylic acid copolymer, acrylic ester/methacrylic acid copolymer, methacrylic ester/acrylic acid copolymer, methacrylic ester/methacrylic acid copolymer, styrene/itaconic acid copolymer, itaconic ester/itaconic acid copolymer, vinylnaphthalene/acrylic acid copolymer, vinylnaphthalene/methacrylic acid copolymer, vinylnaphthalene/itaconic acid copolymer, phenolic resin and copolymers thereof.

In the present invention, the colorant in the second ink composition may be a pigment dispersed in the above anionic resin.

According to another preferred embodiment of the present invention, the anionic material may be a pigment having an anionic functional group on its surface. The anionic group combines with a base to form a salt, enabling pigment particles to be dispersed in water. Anionic functional groups usable herein include, for example, sulfonic acid, carboxylic acid, and phosphoric acid groups. The pigment having an anionic functional group on its surface may be prepared by grafting the functional group onto the surface of the pigment. Commercially available pigments may be used as the pigment, and examples thereof include Microjet CW-1 and Microjet CW-2 (tradename, manufactured by Orient Chemical Industries Ltd.).

Bases usable herein include those described above in connection with the ink composition according to the present invention.

The other components of the ink composition containing an anionic material of the ink set according to the present invention may be basically the same as those of the ink composition according to the present invention.

EXAMPLE

The following examples further illustrate the present invention but are not intended to limit it. In the following examples, "%" is by weight unless otherwise specified.

Example 1

Preparation of Polyallylamine (PAA) Hydrochloride

To 57.1 g of monoallylamine (1 mol) was added 101.4 g (1 mol) of 36% hydrochloric acid. Thus, a 59% aqueous monoallylamine hydrochloride solution was prepared. The solution was concentrated by means of a rotary evaporator to a concentration of 67%. 2,2'-azobis-(2-amidinopropane) dihydrochloride (0.01 mol) was added to the concentrate, and polymerization was carried out at 50° C. for 24 hr. After the completion of the polymerization, the resultant polymer was purified and dried to give PAA hydrochloride. The yield was 90%.

Example 2

Dehydrochlorination of PAA Hydrochloride

PAA hydrochloride (10 g) prepared in Example 1 was dissolved in 90 g of ultrapure water, and the acid portion of the PAA hydrochloride was then removed by using an ion exchange resin (IRA 900, manufactured by Organo Corp.) which had been previously ion-exchanged with sodium hydroxide. The resin thus obtained had an average molecular weight of 5,000.

Example 3

Preparation of Low-molecular Weight PAA

Monoallylamine (286 g, 5 mol) was added dropwise to 550 g (5.3 mol) of 35% hydrochloric acid with stirring at 5 to 10° C. under ice cooling. After the addition of monoallylamine was completed, water and hydrogen chloride were removed at 60° C. under reduced pressure by means of a rotary evaporator to give a white crystal. The crystal was dried at 80° C. under reduced pressure to give 485 g of monoallylamine hydrochloride. The water content of the hydrochloride was measured by thermal analysis (TG) and found to be 4.8%.

The monoallylamine hydrochloride thus prepared was dissolved in water to prepare a 70% aqueous solution of the monoallylamine hydrochloride. A radical initiator, 2,2'-azobis-(2-amidinopropane)dihydrochloride (0.01 mol), was added to 50 g of the aqueous solution, and 25 g of 35% hydrochloric acid was further added thereto. Thereafter, the mixture was allowed to stand at 60° C. for 40 hr, thereby permitting polymerization to proceed. After the completion of the polymerization, the system was poured into a mixed solution composed of acetone (1900 g) and methanol (100 g), and the resultant precipitate was collected by filtration. The filter cake was dissolved in ultrapure water, and the acid portion of the polymer was then removed by using an ion exchange resin (IRA 900, manufactured by Organo Corp.) which had been previously ion-exchanged with sodium hydroxide PAA thus obtained had an average molecular weight of 2,000.

Example 4

PAA was prepared in the same manner as in Example 3, except that the amount of the radical initiator used was doubled. PAA thus obtained had an average molecular weight of 900.

Example 5

PAA was prepared in the same manner as in Example 3, except that the amount of the radical initiator used was tripled and the concentration of the aqueous monoallylamine hydrochloride solution was 50%. PAA thus obtained had an average molecular weight of 600.

Example 6

PAA was prepared in the same manner as in Example 3, except that the amount of the radical initiator was quadrupled and the polymerization time was 80 hr. PAA thus obtained had an average molecular weight of 350.

Further, polymerization was carried out in the same manner as described above to prepare resins having various average molecular weights. Further, other acids also could be used as the salt of the monomer.

In the following description, for example, "PAA (Mw 1,500)" means a free type polyallylamine having a molecular weight of 1,500. "PAA-R (Mw 1,500)" means a free type resin with the N-position of PAA (Mw 1,500) being substituted by R, and "PAA-R, R' (Mw 1,500)" means a free type resin with the N-position of PAA (Mw 1, 500) being substituted by R and R'. "PAA (Mw 1,500) hydrochloride" means that hydrochloric acid has been added as a salt to a free type PAA (Mw 1,500). Further, in the following description, a methyl group, an ethyl group, and a propyl group are abbreviated to "Me," "Et," and "Pr," respectively.

Example 7

90% formic acid (90 g) was added dropwise to 100 g of the 25% aqueous solution of PAA (Mw 5,000) prepared in Example 2 while keeping the aqueous solution at 30° C., and 83 g of 35% formaldehyde was then added dropwise thereto. After the addition of the formaldehyde was completed, the temperature of the system was gradually raised to 80° C. This results in the evolution of carbon dioxide gas. The system was allowed to stand at that temperature for 6 hr. it was confirmed that the evolution of the gas subsided. The reaction mixture was poured into acetone to precipitate the reaction product. The precipitate was collected by filtration and dried to give white powder. The yield was 51.1 g. The product was analyzed by CHN and proton-NMR and confirmed to be a formate of PAA-Me, Me (Mw 7,400).

Example 8

The white powder (20 g) prepared in Example 7 was dissolved in 80 g of ultrapure water, and formic acid was then removed by using an ion exchange resin (IRA 900, manufactured by Organo Corp.) which had been previously ion-exchanged with sodium hydroxide. Thus, PAA-Me, Me (Mw 7,400) was prepared.

Example 9

The procedure of Example 7 was repeated, except that 100 g of the 25% aqueous solution of PAA (Mw 600) prepared in Example 5 was used. Thus, white powder was prepared. The yield was 33.2 g. The product was analyzed by CHN and proton-NMR and confirmed to be a formate of PAA-Me, Me (Mw 890).

Example 10

The white powder (20 g) prepared in Example 9 was dissolved in 80 g of ultrapure water, and formic acid was then removed by using an ion exchange resin (IRA 900, manufactured by Organo Corp.) which had been previously ion-exchanged with sodium hydroxide. Thus, PAA-Me, Me (Mw 890) was prepared.

Example 11

90% formic acid (45 g) was added dropwise to 100 g of the 25% aqueous solution of PAA (Mw 2,000) prepared in Example 3 while keeping the aqueous solution at 30° C. After the addition of formic acid was completed, 41.5 g of 35% formaldehyde was added dropwise thereto. After the addition of the formaldehyde was completed, the temperature of the system was gradually raised to 80° C. This resulted in the evolution of carbon dioxide gas. The system was allowed to stand at that temperature for 6 hr. It was confirmed that the evolution of the gas subsided. The reaction mixture was poured into acetone to precipitate the reaction product. The precipitate was collected by filtration and dried to give white powder. The yield was 42.5 g. The product was analyzed by CHN and proton-NMR and confirmed to be a formate of PAA-Me (Mw 2,500).

Example 12

The white powder (20 g) prepared in Example 11 was dissolved in 80 g of ultrapure water, and formic acid was then removed by using an ion exchange resin (IRA 900, manufactured by Organo Corp.) which had been previously ion-exchanged with sodium hydroxide. Thus, PAA-Me (Mw 2,500) was prepared.

Example 13

A 50% aqueous acetic acid solution (112 g) was added dropwise to 100 g of the 25% aqueous solution of PAA (Mw 900) prepared in Example 4 while keeping the aqueous solution at 30° C. After the addition of acetic acid was completed, 83 g of 35% formaldehyde was added dropwise thereto. After the addition of the formaldehyde was completed, the temperature of the system was gradually raised to 80° C. This resulted in the evolution of carbon dioxide gas. The system was allowed to stand at that temperature for 6 hr. It was confirmed that the evolution of the gas subsided. The reaction mixture was poured into acetone to precipitate the reaction product. The precipitate was collected by filtration and dried to give white powder. The yield was 40.1 g. The product was analyzed by CHN and proton-NMR and confirmed to be an acetate of PAA-Et, Et (Mw 1,750).

Example 14

The white powder (20 g) prepared in Example 13 was dissolved in 80 g of ultrapure water, and acetic acid was then removed by using an ion exchange resin (IRA 900, manufactured by Organo Corp.) which had been previously ion-exchanged with sodium hydroxide. Thus, PAA-Et, Et (Mw 2,100) was prepared.

Example 15

A 50% aqueous acetic acid solution (56 g) was added dropwise to 100 g of the 25% aqueous solution of PAA (Mw 600) prepared in Example 5 while keeping the aqueous solution at 30° C. After the addition of acetic acid was completed, 41.5 g of 35% formaldehyde was added dropwise thereto. After the addition of the formaldehyde was completed, the temperature of the system was gradually raised to 80° C. This resulted in the evolution of carbon dioxide gas. The system was allowed to stand at that temperature for 6 hr. It was confirmed that the evolution of the gas subsided. The reaction mixture was poured into acetone to precipitate the reaction product. The precipitate was collected by filtration and dried to give white powder. The yield was 40.5 g. The product was analyzed by CHN and proton-NMR and confirmed to be an acetate of PAA-Et (Mw 760).

Example 16

The white powder (20 g) prepared in Example 13 was dissolved in 80 g of ultrapure water, and acetic acid was then removed by using an ion exchange resin (IRA 900, manufactured by Organo Corp.) which had been previously ion-exchanged with sodium hydroxide. Thus, PAA-Et (Mw 760) was prepared.

Example 17

90% formic acid (45 g) and 56 g of a 50% aqueous acetic acid solution were added dropwise to 100 g of the 25% aqueous solution of PAA (Mw 350) prepared in Example 6 while keeping the aqueous PAA solution at 30° C. After the addition of formic acid and acetic acid were completed, 93 g of 35% formaldehyde was added dropwise thereto. Thereafter, 96 g of 35% acetic acid was further added thereto. After the addition of acetic acid was completed, the temperature of the system was gradually raised to 80° C. This resulted in the evolution of carbon dioxide gas. The system was allowed to stand at that temperature for 6 hr. It was confirmed that the evolution of the gas subsided. The reaction mixture was poured into acetone to precipitate the reaction product. The precipitate was collected by filtration and dried to give white powder. The yield was 38.0 g. The whole white powder was dissolved in 150 g of ultrapure water, and acetic acid and formic acid were removed by using an ion exchange resin (IRA 900, manufactured by Organo Corp.) which had been previously ion-exchanged with sodium hydroxide. The product was analyzed by CHN and proton-NMR and confirmed to be PAA-Me, Et (Mw 610).

Polyallylamines synthesized in Examples 1 to 6 were reacted with suitably selected carboxylic acids in the same manner as in Examples 7 to 17. As a result, poly-(N-alkylallylamines) or poly-(N,N-dialkylallylamines) having desired molecular weight could be synthesized.

Example 18

Color Ink Set 1

C.I. Acid Yellow 23 (3 g), 8 g of glycerin, and 10 g of diethylene glycol monobutyl ether were added to 15 g of a 15% aqueous solution of PAA-Me, Me (Mw 7,400) prepared in Example 8, and ultrapure water was further added thereto until the total amount reached 100 g. Thus, yellow ink 1 was prepared.

The above procedure was repeated, except that 2 g of C.I. Acid Red 13 was used as the dye instead of C.I. Acid Yellow 23. Thus, magenta ink 1 was prepared. Further, the above procedure was repeated, except that 2 g of C.I. Acid Blue 9 was used as the dye instead of C.I. Acid Yellow 23. Thus, cyan ink 1 was prepared.

These three inks were collectively used as color ink set 1.

Example 19

Color Ink Set 2

C.I. Acid Yellow 17 (3.5 g), 3 g of diethylene glycol, and 7 g of triethylene glycol monobutyl ether were added to 30 g of a 15% aqueous solution of PAA-Me (Mw 2,500) prepared in Example 12, and ultrapure water was further added thereto until the total amount reached 100 g. Thus, yellow ink 2 was prepared.

The above procedure was repeated, except that 3.5 g of C.I. Acid Red 1 was used as the dye instead of C.I. Acid Yellow 17. Thus, magenta ink 2 was prepared. Further, the above procedure was repeated, except that 3.5 g of C.I. Direct Blue 86 was used as the dye instead of C.I. Acid Yellow 17. Thus, cyan ink 2 was prepared.

These three inks were collectively used as color ink set 2.

Example 20

Color Ink Set 3

Daiwa IJ Yellow 214HL (tradename, a product of Daiwa Kasei Co., Ltd., C.I. Direct Yellow 86) (2 g), 5 g of thioglycol, 5 g of diethylene glycol monobutyl ether, 15 g of N-methylimidazole, and 1 g of Surfynol 465 (tradename, a product of Air Products and Chemicals, Inc.) were added to 25 g of a 20% aqueous solution of PAA-Et, Et (Mw 1,750) prepared in Example 14, and ultrapure water was added thereto until the total amount reached 100 g. Thus, yellow ink 3 was prepared.

The above procedure was repeated, except that 6 g of Palatine Fast Pink BNI was used as the dye instead of Daiwa IJ Yellow 214HL. Thus, magenta ink 3 was prepared. Further, the above procedure was repeated, except that 3 g of Project Fast Cyan 1 was used as the dye instead of Daiwa IJ Yellow 214HL. Thus, cyan ink 3 was prepared.

These three inks were collectively used as color ink set 3.

Example 21

Color Ink Set 4

Yellow ink 4, magenta ink 4, and cyan ink 4 were prepared in the same manner as in Example 18, except that 15 g of a 20% aqueous solution of PAA-Me, Me (Mw 890) as the cationic, water-soluble resin was used instead of the 15% aqueous solution of PAA-Me, Me (Mw 7,400) and maltitol was used instead of glycerin.

These three inks were collectively used as color ink set 4.

Example 22

Color Ink Set 5

MY 123 (tradename, a product of Arimoto Chemical Company Ltd.) (3 g) was dissolved in 25 g of a 20% aqueous solution of PAA-Et (Mw 760) prepared in Example 16 to prepare an aqueous cationic, water-soluble resin-dye solution. Thioglycol (10 g) and diethylene glycol monoethyl ether (10 g) were added to the aqueous solution, and ultrapure water was further added thereto until the total amount reached 100 g. Thus, yellow ink 5 was prepared.

The above procedure was repeated, except that 3.2 g of Savinyl Pink 6BLS (tradename, a product of Clariant Japan K.K.) was used as the dye instead of MY 123. Thus, magenta ink 5 was prepared. Further, the above procedure was repeated, except that 3 g of Varifast Fast Blue 1605 was used as the dye instead of MY 123. Thus, cyan ink 5 was prepared.

These three inks were collectively used as color ink set 5.

Example 23

Black Ink 1 and Color Ink Set 6

A 25% aqueous solution of the formate of PAA-Me, Me (Mw 890) prepared in Example 9 was prepared. C.I. Direct Black 195 (6 g), 0.7 g of potassium hydroxide, 10 g of glycerin, 10 g of diethylene glycol monobutyl ether, and 0.8 g of Surfynol 465 as a nonionic surfactant were added to and mixed with 12 g of the 25% aqueous solution, and ultrapure water was further added thereto until the total amount reached 100 g. Thus, black ink 1 was prepared.

Yellow ink 6, magenta ink 6, and cyan ink 6 were prepared in the same manner as described just above, except that 2.5 g of C.I. Direct Yellow 132, 2 g of C.I. Acid Red 249, or 4 g of C.I. Direct Blue 199 was used instead of the above dye. These three inks were collectively used as color ink set 6.

Example 24

Black Ink 2

A styrene/acrylic acid copolymer (tradename: Joncryl 679, Mw 7,000, acid value 200, manufactured by Johnson Polymer Corp.) (8 g) was mixed with a solution of 22 g of triethanolamine and 1.7 g of potassium hydroxide in 1,200 g of ultrapure water, and the mixture was stirred at 70° C. to dissolve the copolymer in the solution. Furnace black, carbon black, was added as a colorant in an amount of 50 g to the mixture. After premixing, dispersion was carried out for 10 hr by means of Eiger Motormill to prepare a dispersion. Zirconia was used as a dispersing ball. Glycerin (120 g) was added to the dispersion to prepare black ink 2. The average particle diameter of carbon black in the ink was 160 nm.

Example 25

Black Ink 3

Carbon black (tradename: Microjet CW-1, Orient Chemical Industries, Ltd.), which had been subjected to alkali-reactive group treatment, was added in an amount of 100 g to 400 g of ultrapure water with stirring to prepare a dispersion. Other ingredients were added thereto so that the final ink comprised 8% of carbon black, 10% of glycerin, 10% of triethylene glycol monobutyl ether, 1% of Surfynol 465, and 1% of 2-dimethylaminoethanol with the balance consisting of water. Thus, black ink 3 was prepared. The average particle diameter of carbon black in the ink was 75 nm.

Comparative Example 1

Color Ink Set 7

Yellow ink 7, magenta ink 7, and cyan ink 7 were prepared in the same manner as in Example 18, except that PAA-Me, Me (Mw 7,400) was not used. These three inks were collectively used as color ink set 7.

Comparative Example 2

Color Ink Set 8

Yellow ink 8, magenta ink 8, and cyan ink 8 were prepared in the same manner as in Example 20, except that PAA-H (tradename, free type polyallylamine, Mw 100,000, manufactured by Nitto Boseki Co., Ltd.) was used instead of PAA-Et, Et (Mw 1,750). All of these inks had a viscosity of 10 mPa.s. These three inks were collectively used as color ink set 8.

Comparative Example 3

Color Ink Set 9

Yellow ink 9, magenta ink 9, and cyan ink 9 were prepared in the same manner as in Example 22, except that SP-200 (tradename, polyethyleneimine, manufactured by Nippon Shokubai Kagaku Kogyo Co., Ltd.) was used instead of PAA-Et (Mw 760). These three inks were collectively used as color ink set 9.

Evaluation of ink composition

The ink compositions prepared above were evaluated by the following tests in which a modified color printer MJ-5000C, manufactured by Seiko Epson Corporation was used. The inks were used in the evaluation after filtration through a 5 μm filter.

Evaluation test 1: Waterproofness

A 1.5 cm-width full density blotted image for each of black, yellow, magenta, cyan, red, green, and blue was printed at intervals of 3.5 cm (non-recorded areas) on plain paper (tradename; Zerox-P, manufactured by Fuji Xerox Co., Ltd.) of size A4 as a recording medium. The records were allowed to air-dry for one hr and then immersed in 500 ml of water for one hr. Thereafter, the wetted records were allowed to air-dry for 24 hr, and halos (migration of ink) in the non-recorded areas and fading in the recorded areas were visually inspected. The results were evaluated according to the following criteria.

A: Neither halos in non-recorded areas nor change in recorded areas

B: For some inks, slight halos in non-recorded areas

C: Significant halos in non-recorded areas and fading in recorded areas

Evaluation test 2: Bleeding

The same recording medium and printer as used in the evaluation test 1 were provided, and a full color image was printed by combining the black ink and the color ink set prepared in the examples and the comparative examples. Thereafter, the image was visually inspected for bleeding in black ink recorded areas. The results were evaluated according to the following criteria.

A: No bleeding on paper and color print

B: No bleeding on paper with slight bleeding on color print

C: Bleeding to some extent on either or both of paper and color print

D: Significant bleeding on either or both of paper and color print

Evaluation test 3: Environmental stability

An ink sealed into a container was allowed to stand at 60° C. for one day and then at −30° C. for one day. This procedure was repeated ten times. Thereafter, the ink was visually inspected for creation of a precipitate and discoloration of the ink. The results were evaluated according to the following criteria:

A: No change

B: Precipitate or discoloration developed

C: Significant precipitate or discoloration developed

The results are summarized in the following table.

| Color ink set | Black ink | Water-proofness | Bleed-ing | Environmental stability |
|---|---|---|---|---|
| 1 | 2 | A | A | A |
| 2 | 2 | A | A | A |
| 3 | 3 | A | A | A |
| 4 | 3 | A | A | A |
| 5 | 3 | A | A | A |
| 6 | 1 | A | C | A |
| 7 | 2 | C | B | A |
| 8 | — | —(*1) | —(*1) | A |
| 9 | 3 | A | A | C |

Note)
*1: No ink could be ejected from about 50% of nozzles, and droplet trajectory directionality problem was created on ink ejected from 30% of nozzles, yielding no good print. This made it impossible to perform the evaluation of waterproofness and bleeding.

What is claimed is:

1. An ink composition consisting essentially of an alkali-soluble colorant, a water-soluble organic solvent, water, a cationic, water-soluble resin, a base which is hydroxide of an alkali metal or an alkaline earth metal and, optionally, one or more of a nonionic water-soluble resin and an assistant selected from the group consisting of a penetration accelerator, a viscosity modifier, a surface tension modifier, a hydrotropy agent, a humectant, a pH adjustor, an antimold, a chelating agent, a preservative and a rust preventive; the cationic, water-soluble resin consisting of repeating units represented by the following formula (I):

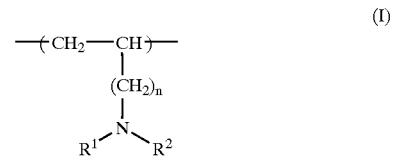

wherein $R^1$ and $R^2$ which may be the same or different represent $C_{1-5}$ alkyl group, and n is 0, 1, or 2.

2. The ink composition according to claim 1, wherein the cationic, water-soluble resin has an average molecular weight of 300 to 10,000.

3. The ink composition according to claim 1, wherein the cationic, water-soluble resin is an acid addition salt.

4. The ink composition according to claim 1, wherein both $R_1$ and $R_2$ in the repeating unit represented by the formula (I) represent a methyl group.

5. The ink composition according to claim 1, wherein n is 1.

6. The ink composition according to claim 1, wherein the water-soluble organic solvent has a lower vapor pressure than water.

7. The ink composition according to claim 1, wherein the water-soluble organic solvent is contained in an amount of 5 to 50% by weight based on the total amount of the ink.

8. The ink composition according to claim 1, wherein the colorant is a dye or pigment.

9. The ink composition according to claim 1, which comprises the nonionic, water-soluble resin.

10. An ink set comprising a first ink composition or a group of first ink compositions and a second ink composition or a group of second ink compositions, the first ink composition being the ink composition according to claim 1, the second ink composition being an ink composition comprising an anionic material.

11. The ink set according to claim 10, wherein the group of first ink compositions comprises a yellow ink, a magenta ink, and a cyan ink and the second ink composition is a black ink.

12. The ink set according to claim 10, wherein the first ink composition is a black ink and the second group of ink compositions comprises a yellow ink, a magenta ink, and a cyan ink.

13. The ink set according to claim 10, wherein the anionic material contained in the second ink composition is an anionic, water-soluble resin.

14. The ink set according to claim 13, wherein the second ink composition comprises a pigment.

15. The ink set according to claim 10, wherein the anionic material in the second ink composition is a pigment having an anionic functional group on its surface.

16. A recording method comprising the step of:

depositing an ink composition according to claim 1 onto a recording medium to form an image on the recording medium.

17. The ink composition according to claim 1, wherein the penetration accelerator is a lower alcohol, a cellosolve, a carbitol, or a sufactant.

18. The ink composition according to claim 17, wherein the lower alcohol is ethanol, isopropanol, butanol, or pentanol.

19. The ink composition according to claim 17, wherein the cellosolve is ethylene glycol monobutyl ether.

20. The ink composition according to claim 17, wherein the carbitol is diethylene glycol monobutyl ether, or triethylene glycol monobutyl ether glycol ether.

21. The ink composition according to claim 1, wherein the surface tension modifier is diethanolamine, triethanolamine, an alcohol, or a nonionic, cationic, anionic or amphoteric surfactant.

22. The ink composition according to claim 21, wherein the alcohol comprises glycerin and diethylene glycol.

23. The ink composition according to claim 1, wherein the hydrotropy agent is alkylurea, ethyleneurea, propyleneurea, thiourea, a guanidine acid salt, or a tetraalkylammonium halide.

24. The ink composition according to claim 1, wherein the humectant is glycerin, diethylene glycol or a saccharide.

25. The ink composition according to claim 24, wherein the saccharide is maltitol, sorbitol, gluconic lactone, or maltose.

26. An ink set consisting of a black ink, a yellow ink, a cyan ink, and a magenta ink, said black, yellow, cyan, and magenta inks each independently consisting essentially of an alkali-soluble colorant, a water-soluble organic solvent, water, cationic water-soluble resin, a base which is a hydroxide of an alkali metal or an alkaline earth metal and, optionally, one or more of a nonionic water-soluble resin and an assistant selected from the group consisting of a penetration accelerator, a viscosity modifier, a surface tension modifier, a hydrotropy agent, a humectant, a pH adjustor, an antimold, a chelating agent, a preservative and a rust preventive;

the cationic, water-soluble resin consisting of repeating units represented by the following formula (I):

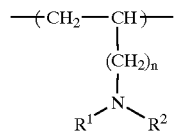

where $R^1$ and $R^2$ which may be the same or different represent a $C_{1-5}$ alkyl group, and n is 0, 1, or 2, wherein the alkali-soluble colorant for the black ink is selected from the group of dyes consisting of C.I. Direct Black 19, 35, 154, 168, 171, and 195 and C.I. Food Black 2 the alkali-soluble colorant for the yellow ink is selected from the group of dyes consisting of C.I. Direct Yellow 50, 55, 86, 132, 142, and 144 and C.I. Acid Yellow 23 the alkali-soluble colorant for the cyan ink is selected from the group of dyes consisting of C.I. Direct Blue 86, 87 and 199 and C.I. Blue 9 and 249, the alkali soluble colorant for the magenta ink is selected from the group of dyes consisting of C.I. Direct Red 9 and 227, C.I. Acid Red 52 and 289, and dyes represented by the following structural formula (II):

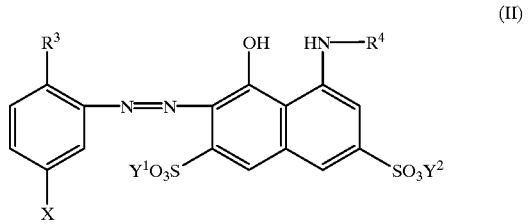

wherein $R^3$ and $R^4$ represent a hydrogen atom, a $C_{1-5}$ alkyl group, or a phenoxy group or a derivative thereof, a triazine ring or a derivative thereof, a carboxyl group or a salt thereof, or a sulfonyl group or a derivative thereof;

X represents a hydrogen or halogen atom; and $Y^1$ and $Y^2$ which may be same or different represent an alkali metal atom, ammonium or a $C_{1-5}$ alkylammonium.

27. An ink jet recording method comprising the steps of:

(a) providing an ink set of claim 26 and (b) depositing droplets of each of the black, yellow, cyan and magenta inks of the ink set onto a recording medium to form an image on the recording medium.

28. An ink composition comprising an alkali-soluble colorant, a water-soluble organic solvent, water, and a cationic, water-soluble resin, the cationic, water-soluble resin consisting of repeating units represented by the following formula (I):

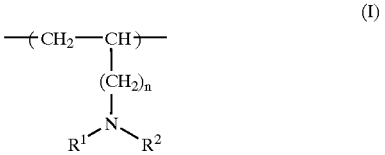

wherein $R^1$ and $R^2$ which may be the same or different represent a hydrogen atom or a $C_{1-5}$ alkyl group, provided that $R^1$ and $R^2$ do not simultaneously represent a hydrogen atom; and n is 1.

29. The ink composition according to claim 28, wherein the cationic, water-soluble resin has an average molecular weight of 300 to 10,000.

30. The ink composition according to claim 28, wherein the cationic, water-soluble resin is an acid addition salt.

31. The ink composition according to claim 28, which further comprises a base.

32. The ink composition according to claim 28, wherein the base is a hydroxide of an alkali metal or an alkaline earth metal.

33. The ink composition according to claim 28, wherein both $R_1$ and $R_2$ in the repeating unit represented by the formula (I) represent a methyl group.

34. The ink composition according to claim 28, wherein the water-soluble organic solvent has a lower vapor pressure than water.

35. The ink composition according to claim 28, wherein the water-soluble organic solvent is contained in an amount of 5 to 50% by weight based on the total amount of the ink.

36. The ink composition according to claim 28, wherein the colorant is a dye or a pigment.

37. The ink composition according to claim 28, which further comprises a nonionic, water-soluble resin.

38. An ink set comprising a first ink composition or a group of first ink compositions and a second ink composition or a group of second ink compositions,
the first ink composition being the ink composition according to claim 28,
the second ink composition being an ink composition comprising an anionic material.

39. The ink set according to claim 38, wherein the group of first ink compositions comprises a yellow ink, a magenta ink, and a cyan ink and
the second ink composition is a black ink.

40. The ink set according to claim 38, wherein the first ink composition is a black ink and the second group of ink compositions comprises a yellow ink, a magenta ink, and a cyan ink.

41. The ink set according to claim 38, wherein the anionic material contained in the second ink composition is an anionic, water-soluble resin.

42. The ink set according to claim 41, wherein the second ink composition comprises a pigment.

43. The ink set according to claim 38, wherein the anionic material in the second ink composition is a pigment having an anionic, functional group on its surface.

44. A recording method comprising the step of:
depositing an ink composition according to claim 28 onto a recording medium to form an image on the recording medium.

45. An ink set comprising a black ink, a yellow ink, a cyan ink, and a magenta ink, said black, yellow, cyan, and magenta inks each independently comprising an alkali-soluble colorant, a water-soluble organic solvent, water, and a cationic, water-soluble resin,
the cationic, water-soluble resin consisting of repeating units represented by the following formula (I):

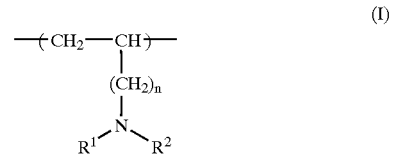

wherein $R^1$ and $R^2$ which may be the same or different represent a $C_{1-5}$ alkyl group, and n is 1, the black ink comprising a colorant selected from the group of dyes consisting of C.I. Direct Black 19, 35, 154, 168, 171, and 195 and C.I. Food Black 2, the yellow ink comprising a colorant selected from the group of dyes consisting of C.I. Direct Yellow 50, 55, 86, 132, 142, and 144 and C.I. Acid Yellow 23, the cyan ink comprising a colorant selected from the group of dyes consisting of C.I. Direct Blue 86, 87, and 199 and C.I. Acid Blue 9 and 249, the magenta ink comprising a colorant selected from the group of dyes consisting of C.I. Direct Red 9 and 227, C.I. Acid Red 52 and 289, and dyes represented by the following structural formula (II):

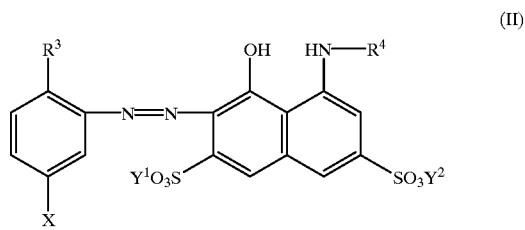

wherein $R^3$ and $R^4$ represent a hydrogen atom, a $C_{1-5}$ alkyl group, an aryl group, a $C_{1-5}$ alkoxy group, or a phenoxy group or a derivative thereof, a triazine ring or a derivative thereof, a carboxyl group or a salt thereof, or a sulfonyl group or a derivative thereof;

X represents a hydrogen or halogen atom; and $Y^1$ and $Y^2$ which may be the same or different represent an alkali metal atom ammonium, or a $C_{1-5}$ alkylammonium.

46. An ink jet recording method comprising the steps of:
(a) providing an ink set of claim 45 and (b) depositing droplets of each of the black, yellow, cyan and magenta inks of the ink set onto a recording medium to form an image on the recording medium.

* * * * *